US009937837B2

United States Patent
Tsuji et al.

(10) Patent No.: US 9,937,837 B2
(45) Date of Patent: Apr. 10, 2018

(54) VEHICLE SEAT

(71) Applicant: TOYOTA BOSHOKU KABUSHIKI KAISHA, Aichi-ken (JP)

(72) Inventors: Hiroshi Tsuji, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 92 days.

(21) Appl. No.: 15/059,900

(22) Filed: Mar. 3, 2016

(65) Prior Publication Data

US 2016/0257230 A1 Sep. 8, 2016

(30) Foreign Application Priority Data

Mar. 5, 2015 (JP) ................. 2015-043925

(51) Int. Cl.
  *B60N 2/68* (2006.01)
  *B60N 2/64* (2006.01)
  *A47C 5/04* (2006.01)

(52) U.S. Cl.
  CPC ............. *B60N 2/68* (2013.01); *A47C 5/043* (2013.01); *B60N 2/64* (2013.01); *B60N 2/643* (2013.01)

(58) Field of Classification Search
  CPC .. B60N 2/643; B60N 2/68; A47C 5/04; A47C 5/043; A47C 7/02; A47C 7/40; B21D 7/00; B21D 53/88
  USPC ........................................ 297/452.18, 452.2
  See application file for complete search history.

(56) References Cited

U.S. PATENT DOCUMENTS

| 2,077,454 | A | * | 4/1937 | Almdale | B21D 53/00 138/171 |
| 2,285,275 | A | * | 6/1942 | Harder | F16L 9/01 138/155 |
| 3,501,200 | A | * | 3/1970 | Ohta | B60N 2/4228 296/68.1 |
| 3,705,604 | A | * | 12/1972 | Christin | B21D 7/06 138/178 |
| 2009/0102234 | A1 | * | 4/2009 | Heatherington | B21D 22/025 296/187.03 |
| 2014/0015280 | A1 | * | 1/2014 | Ohta | B62D 21/152 296/187.08 |
| 2014/0021766 | A1 | * | 1/2014 | Watanabe | B21D 53/88 297/452.18 |

(Continued)

FOREIGN PATENT DOCUMENTS

DE  102012101591 A1 *  8/2012  ......... B21C 37/0803
JP  5-68353  9/1993

(Continued)

*Primary Examiner* — Ryan D Kwiecinski
(74) *Attorney, Agent, or Firm* — Greenblum & Bernstein, PLC (57) ABSTRACT

A vehicle seat includes a seat frame. The seat frame has a hollow deformable portion that is bent, and linear recessed portions formed by partially recessing an inner side of the deformable portion. The deformable portion has a linear separation portion formed in a projecting manner relative to the recessed portions and extending on the inner side of the deformable portion. A plurality of recessed portions is formed on each of one side and the other side of the separation portion so as to sandwich the separation portion, and placed independently from each other such that adjacent recessed portions are not connected to each other.

10 Claims, 9 Drawing Sheets

(56) References Cited

U.S. PATENT DOCUMENTS

| | | | | |
|---|---|---|---|---|
| 2014/0062124 A1* | 3/2014 | Accossato | ............... | B60J 5/06 |
| | | | | 296/155 |
| 2014/0084628 A1* | 3/2014 | Sutar | ............... | B21D 9/00 |
| | | | | 296/190.03 |
| 2014/0232162 A1* | 8/2014 | Mitsuhashi | ............... | B60N 2/68 |
| | | | | 297/452.18 |
| 2015/0224563 A1* | 8/2015 | Aso | ............... | B21D 22/26 |
| | | | | 428/595 |

FOREIGN PATENT DOCUMENTS

| | | | | | |
|---|---|---|---|---|---|
| JP | 2009073420 A | * | 4/2009 | ............ | B21D 53/88 |
| JP | 2013-248945 | | 12/2013 | | |
| JP | 2015003631 A | * | 1/2015 | ............ | B60N 2/682 |

* cited by examiner

VEHICLE SEAT

INCORPORATION BY REFERENCE

The disclosure of Japanese Patent Application No. 2015-043925 filed on Mar. 5, 2015 including the specification, drawings and abstract is incorporated herein by reference in its entirety.

BACKGROUND OF THE INVENTION

1. Field of the Invention

The present invention relates to a vehicle seat including a metal seat frame (in a hollow tubular shape) that forms a sheet outer shape.

2. Description of Related Art

As such a type of a vehicle seat, there has been known a vehicle seat including a seat cushion and a seatback (see Japanese Utility Model Application Publication No. 5-68353 (JP 5-68353 U)). The seatback is a member connected to the seat cushion in an uprising manner, and includes a metal seat frame (an arch-shaped frame body) that forms a seat framework. The seat frame is a hollow member (a generally rectangular shape in a sectional view), and is formed such that a metal member in a planar shape is molded into a hollow tubular shape and then bent into an arch shape.

SUMMARY OF THE INVENTION

In the meantime, in a case of this type of a seat frame, when the seat frame is deformed (bent) into an arch shape, a stress in an extension direction is applied to an outer side of this member and a stress in a contraction direction is applied to an inner side thereof (a circumference length difference occurs). From the viewpoint of improving durability of a seat, relatively hard metal tends to be used for the seat frame (as a material thereof). Accordingly, in the configuration of the technique as known in the art, as the seat frame becomes harder, excessive deformation (recessing deformation on the inner side and breakage on the outer side) may occur due to the circumference length difference. The present invention provides a vehicle seat that can prevent excessive deformation of a seat frame as much as possible.

A vehicle seat according to an aspect of the present invention includes a seat frame. The seat frame has a hollow deformable portion that is bent, and linear recessed portions formed by partially recessing an inner side of the deformable portion.

In the present aspect, the deformable portion has a linear separation portion formed in a projecting manner relative to the recessed portions and extending on the inner side of the deformable portion, and a plurality of recessed portions is formed on each of one side and the other side of the separation portion so as to sandwich the separation portion and placed independently from each other such that adjacent recessed portions are not connected to each other. In the present aspect, the recessed portions are formed independently across the separation portion so as not to become excessively large. By preferably preventing a strong stress from being applied to only a specific recessed portion as such, the deformable portion of the seat frame can be bent while the recessed portions are recessed as equally as possible.

In the above aspect, each of the recessed portions may have a shape gradually inclined in a direction to be distanced from one end of the seat frame to the other end thereof in the deformable portion. In the above configuration, the shape of each of the recessed portions is a shape that follows a stress distribution to occur on an inner side of the deformable portion at the time of bending the deformable portion. Hereby, the deformable portion can be bent while the recessed portions are recessed smoothly.

In the above aspect, the recessed portions placed on the one side of the separation portion and the recessed portions placed on the other side of the separation portion may be placed in a symmetric manner across the separation portion. In the above configuration, the recessed portions on the one side and the recessed portions on the other side are placed in a symmetric manner across the separation portion, so that the deformable portion can be bent in a good balance with the recessed portions on both sides being taken as base points.

In the above aspect, the recessed portions may be each formed in a shape in which a part close to the separation portion has a width narrower than the other part thereof. In the above configuration, it is possible to preferably avoid each of the recessed portions from being connected to another recessed portion adjacent thereto on a tip end side formed with a narrow width.

According to the above aspect, it is possible to prevent excessive deformation of the seat frame as much as possible. Further, according to the above configuration, the deformable portion of the seat frame can be bent while the recessed portions are recessed smoothly and equally. Further, according to another configuration, the deformable portion of the seat frame can be bent in a good balance. According to further another configuration, it is possible to preferably avoid each of the recessed portions from being connected to another recessed portion adjacent thereto on the tip end side formed with a narrow width.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment for carrying out the present invention with reference to FIGS. 1 to 9. In each of the drawings, a reference sign F is assigned to a vehicle-seat forward side, a reference sign B is assigned to a vehicle-seat rearward side, a reference sign UP is assigned to a vehicle-seat upper side, and a reference sign DW is assigned to a vehicle-seat lower side, a reference sign R is assigned to a vehicle-seat right side, and a reference sign L is assigned to a vehicle-seat left side, appropriately. A vehicle seat 2 in FIG. 1 includes a seat cushion 4, a seatback 6, and a headrest 8. These seat components each includes: a seat frame (4F, 6F, 8F) forming a seat framework; a seat pad (4P, 6P, 8P) forming a seat outer shape; and a seat cover (4S, 6S, 8S) covering the seat pad.

Figure 1:
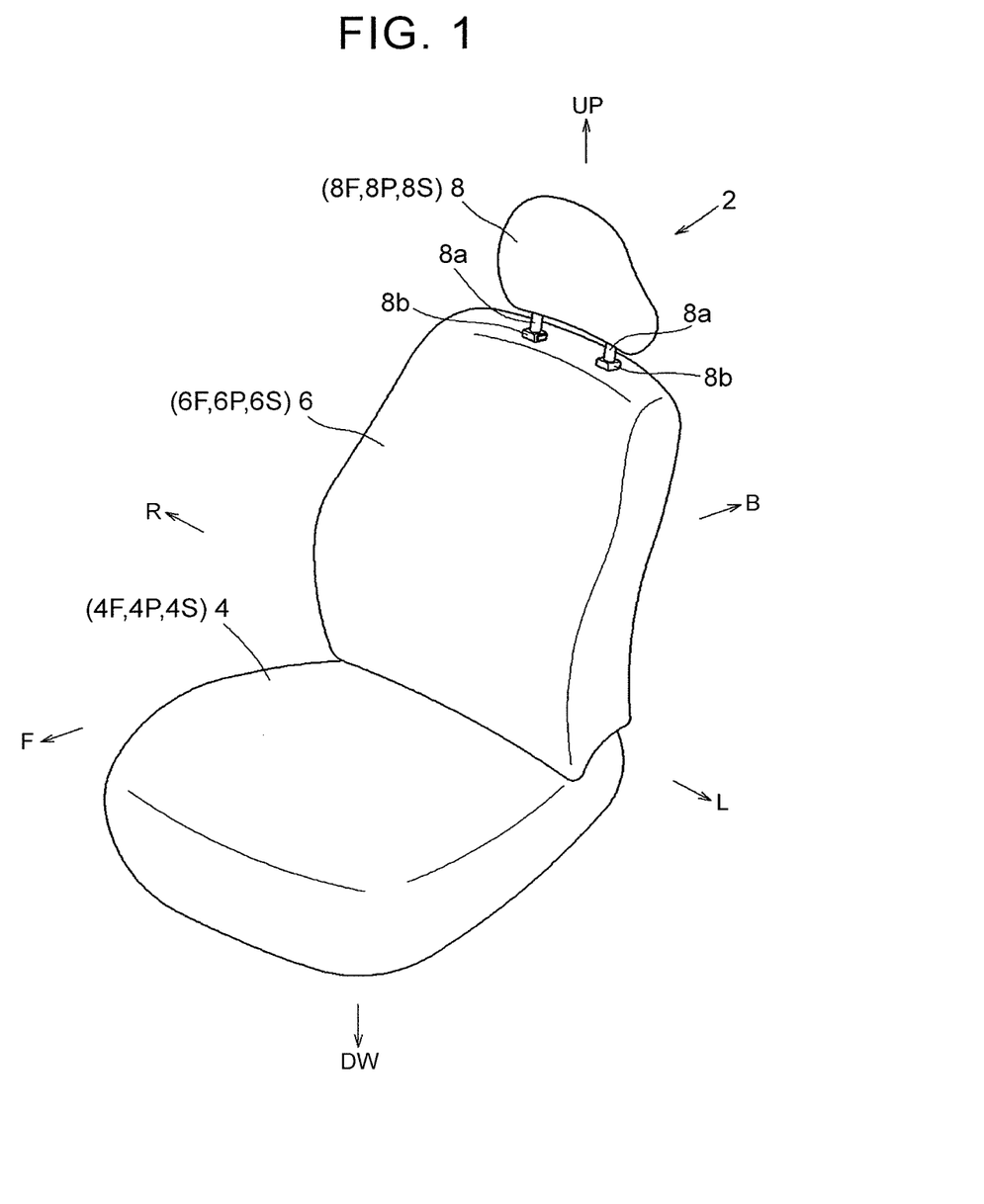
FIG. 1 is a perspective view of a vehicle seat.
Figure 2:
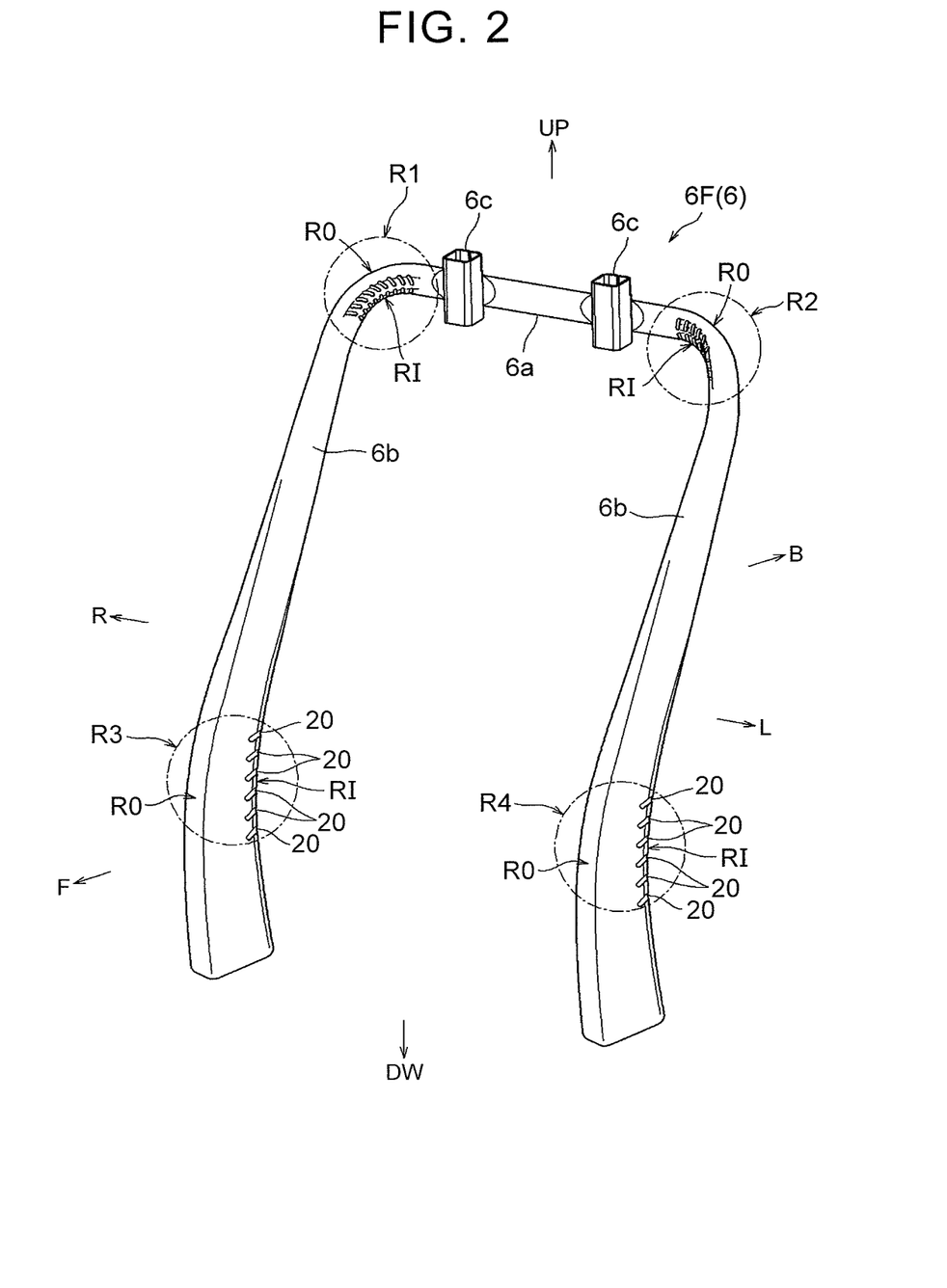
FIG. 2 is a perspective view of a seat frame.

In the present embodiment, a lower part of the seatback 6 is connected to a rear part of the seat cushion 4 in a rising and tilting manner, and the headrest 8 is disposed on an upper part of the seatback 6 in an uprising state via a pair of headrest stays 8a. The pair of headrest stays 8a are bar-type members, and project from the lower part of the headrest 8 at a predetermined interval in a seat-width direction. With reference to FIGS. 1 and 2, the pair of headrest stays 8a can be inserted into holders 6c in the after-mentioned seatback 6 through respective tubular headrest supports 8b.

With reference to FIGS. 1 to 5, the seatback 6 has the above basic constituents 6F, 6P, 6S and the after-mentioned related constituents (a plurality of deformable portions R1 to R4, a separation portion 10, a plurality of recessed portions 21a to 21i, 22a to 22i, 20). Here, the seat pad 6P (not shown) is a member that forms a seat outer shape and elastically supports an occupant, and can be formed from a foaming resin such as polyurethane foam (a density: 10 kg/m$^3$ to 40 kg/m$^3$). Further, the seat cover 6S is a face material that covers the seat pad 6P, and can be formed of fabric (woven fabric, knitted fabric, nonwoven fabric) and leather (natural leather, synthetic leather).

With reference to FIG. 2, the seat frame 6F is an arch-shaped metal frame body that forms a seat framework, and includes an upper frame 6a, a pair of side frames 6b, and a plurality of deformable portions R1 to R4 (details thereof will be described later). The seat frame 6F is formed by bending a continuous tubular base material appropriately, and the upper frame 6a, the side frames 6b, and the deformable portions R1 to R4 are integrated (a formation method of the seat frame will be described later). Here, various metals that are plastically deformable can be exemplified as a material of the seat frame 6F, and hard metal excellent in strength is preferable. As this type of material, metals such as steel (stainless steel or the like), aluminum alloy, magnesium alloy, and titanium alloy can be exemplified, and especially, a high strength steel plate having a tensile strength of 900 Mpa or more, such as a 980 Mpa-grade high tensile strength steel material, is preferable.

Referring now to FIG. 2, the upper frame 6a is a cylindrical (pipe-shaped) part that forms an upper part of the seat frame 6F and extends in the seat-width direction. A pair of holders 6c are attached to the upper frame 6a at an appropriate interval in the seat-width direction. The pair of holders 6c are four-square tubular parts into which the headrest supports 8b can be inserted, and are extended in a seat up-down direction on the basis of a seatback uprising state. The pair of side frames 6b are four-square tubular parts that form side portions of the seat frame 6F, and extend in the seat up-down direction on the basis of a seatback uprising state.

Figure 3:
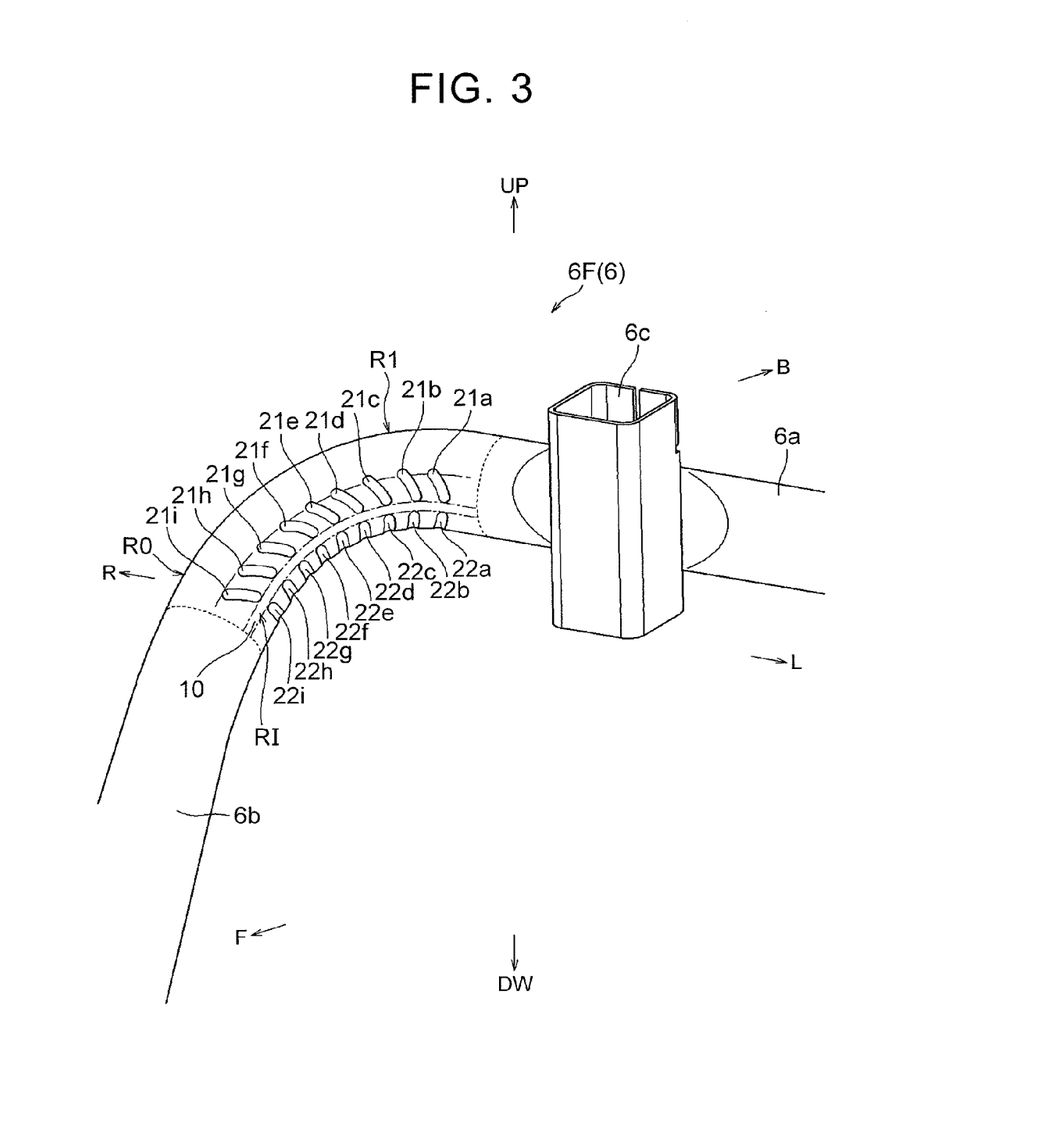
FIG. 3 is an enlarged perspective view of part of the seat frame.

With reference to FIG. 2, the seat frame 6F is bent at the deformable portions R1 to R4 so as to have an arch shape that follows the seat outer shape. With reference to FIGS. 2, 3, the deformable portions R1 to R4 are formed by bending at a plurality of recessed portions 21a to 21i, 22a to 22i, 20 (details thereof will be described later) as base points, so that a stress in a contraction direction is applied to parts to become an inner side R1 and a stress in an extension direction is applied to parts to become an outer side R0 at the time of deformation. In view of this, at the time of bending the deformable portions R1 to R4, the recessed portions 21a to 21i, 22a to 22i, 20 are further recessed so as to absorb a circumference length difference between the outer side R0 and the inner side R1. In this type of configuration, from the viewpoint of preventing excessive deformation of the seat frame 6F, it is desirable to recess the recessed portions 21a to 21i, 22a to 22i, 20 as equally as possible. In view of this, in the present embodiment, with the after-mentioned configuration, the excessive deformation of the seat frame 6F is restrained as much as possible. The following describes each constituent more specifically.

With reference to FIG. 2, each of the plurality of deformable portions (the first deformable portion R1 to the fourth deformable portion R4) is a part formed by bending the seat frame 6F, and includes the after-mentioned plurality of recessed portions 21a to 21i, 22a to 22i, 20 and the after-mentioned separation portion 10. The first deformable portion R1 is a cylindrical part that is bent and placed on an upper-right side of the seat frame 6F, and is placed between the upper frame 6a extending in the seat-width direction and the side frame 6b extending in the seat up-down direction. Further, the second deformable portion R2 is also a cylindrical part that is bent and placed on an upper-left side of the seat frame 6F, and is placed between the upper frame 6a and the side frame 6b. In each of the first deformable portion R1 and the second deformable portion R2, a side facing a seat outward side is the outer side R0 and a side facing a seat inward side is the inner side R1. Further, each of the third deformable portion R3 and the fourth deformable portion R4 is a four-square tubular part that is bend toward a seat forward side, and is placed in the middle of each side frame 6b. In each of the third deformable portion R3 and the fourth deformable portion R4, a surface facing a seat front side is the outer side R0 and a side facing a seat rear side is an inner side R1.

In the present embodiment, with reference to FIG. 2, the first deformable portion R1 and the second deformable portion R2 have the separation portion and the plurality of recessed portions with generally the same configuration, so the following describes the separation portion 10 and the plurality of recessed portions 21a to 21i, 22a to 22i of the first deformable portion R1 as an example. That is, with reference to FIGS. 3 to 5, in the first deformable portion R1, a linear separation portion 10 that extends from an upper-frame-6a side to a side-frame-6b side is formed in a center of the inner side R1. The separation portion 10 has a shape projecting toward a circumferential surface relative to the after-mentioned recessed portions 21a to 21i, 22a to 22i. In the present embodiment, the separation portion 10 is formed on the circumferential surface itself of a general first deformable portion R1 that is not recessed.

Figure 4:
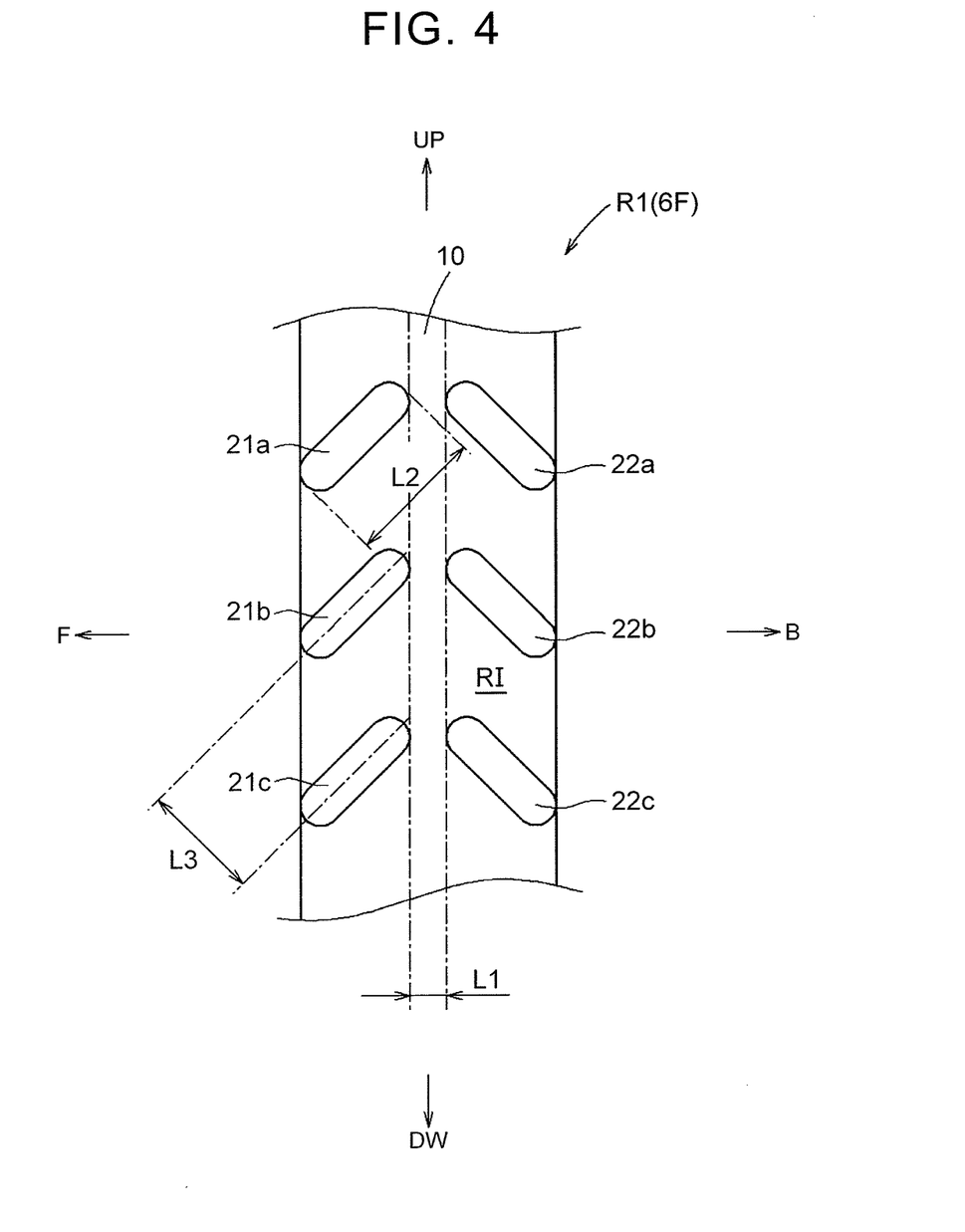
FIG. 4 is an enlarged front view of part of an inner side of the seat frame.
Figure 5:
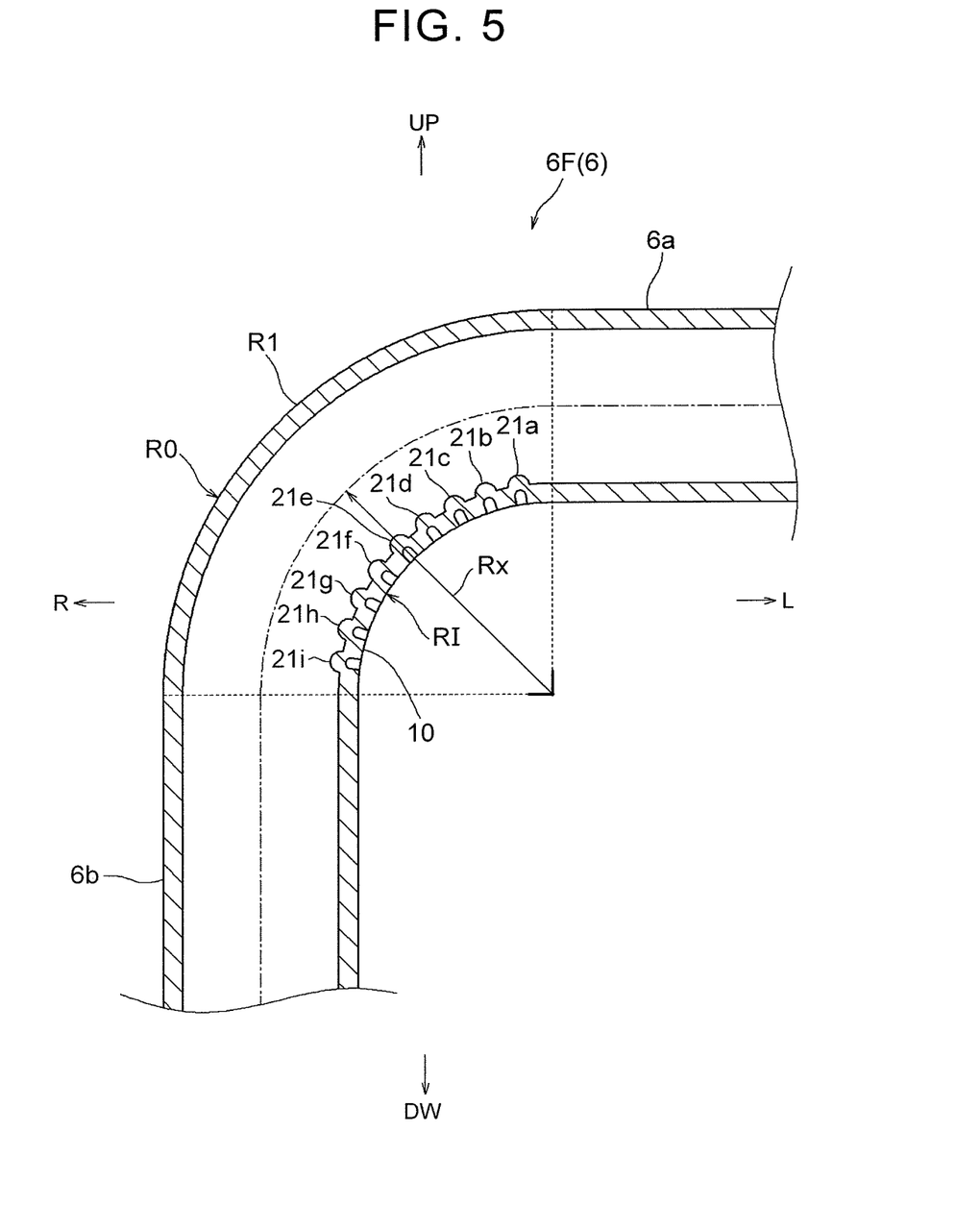
FIG. 5 is a schematic sectional view of part of the seat frame.
Figure 6:
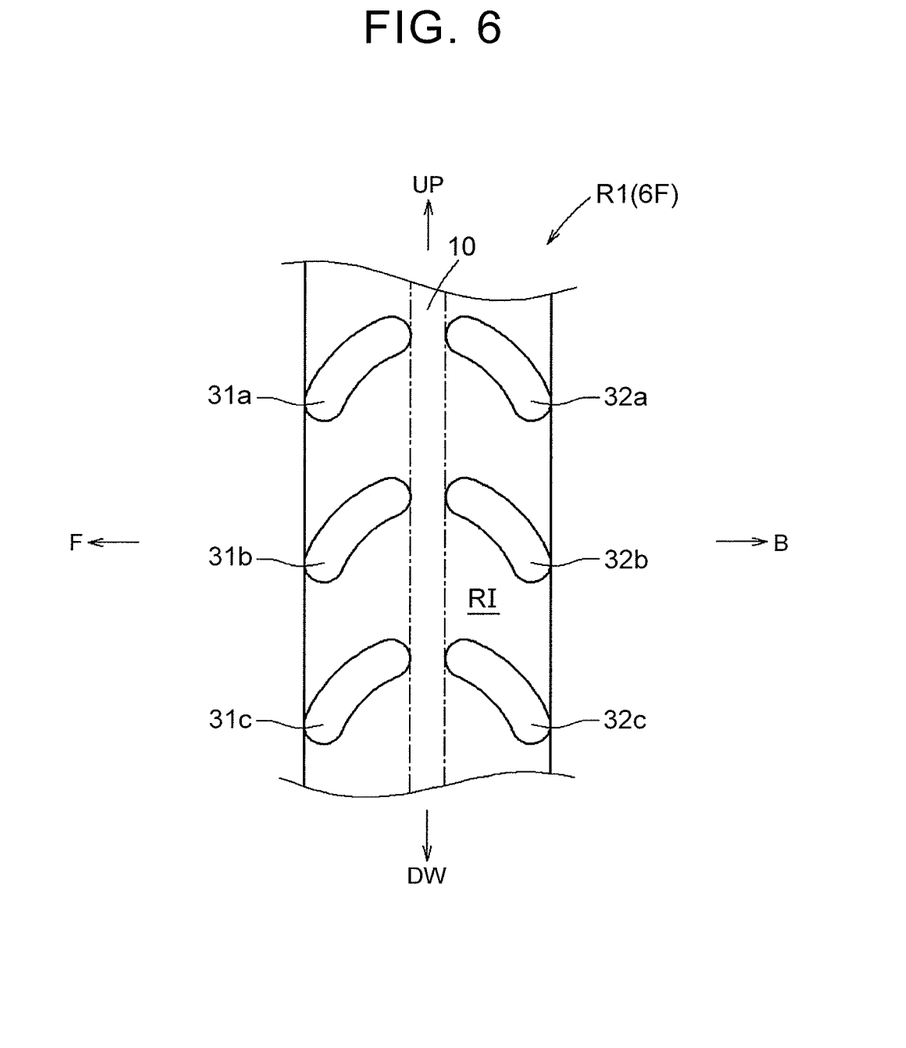
FIG. 6 is an enlarged front view of part of an inner side of a seat frame according to Modification 1.

Further, with reference to FIGS. 3 to 5, the plurality of recessed portions (front-side recessed portions 21a to 21i, rear-side recessed portions 22a to 22i) are parts that are formed by partially recessing the circumferential surface on the inner side R1 of the first deformable portion R1 in a linear manner. In the present embodiment, the front-side recessed portions 21a to 21i and the rear-side recessed portions 22a to 22i are placed sequentially in a symmetric manner across the separation portion 10, and they are placed independently from each other such that adjacent recessed portions are not connected to each other even after the first deformable portion R1 is bent. The plurality of front-side recessed portions 21a to 21i is recessed parts each having a straight shape and sequentially placed on a front side of the separation portion 10 at appropriate intervals. Each of the plurality of front-side recessed portions 21a to 21i is gradually inclined in a direction to be distanced from the separation portion 10 as it goes toward the side frame 6b from the upper frame 6a. Further, the plurality of rear-side recessed portions 22a to 22i is recessed parts each having a straight shape and sequentially placed on a rear side of the separation portion 10 at appropriate intervals. Each of the plurality of rear-side recessed portions 22a to 22i is gradually inclined in a direction to be distanced from the separation portion 10 as it goes toward the side frame 6b from the upper frame 6a. In the present embodiment, the front-side recessed portions 21a to 21i and the rear-side recessed portions 22a to 22i are placed sequentially in a symmetric manner across the separation portion 10. That is, with reference to FIG. 4, the front-side recessed portion 21a and the rear-side recessed portion 22a that are placed closest to the upper frame 6a are placed in a symmetric manner in the seat front-rear direction across the separation portion 10, when viewed from the inner side of the seat frame 6F. The remaining front-side recessed portions 21b to 21i and the remaining rear-side recessed portions 22b to 22i are also placed sequentially in a symmetric manner across the separation portion 10.

Here, configurations (a dimension, a shape, a separation dimension) of the plurality of recessed portions 21a to 21i, 22a to 22i and the separation portion 10 can be set typically according to a bending degree of each of the deformable portions R1 to R4. For example, with reference to FIG. 5, it is assumed that the first deformable portion R1 with a bend radius of R×80 mm is formed in the cylindrical seat frame 6F (diameter φ=35 mm, thickness t=1.0 mm, material=980 Mpa-grade high tensile strength steel material). At this time, with reference to FIG. 4, a width dimension L1 of the separation portion 10 can be set to 5 to 15 mm in the first deformable portion R1 before the deformation. Further, in the first deformable portion R1 before the deformation, a length dimension L2 of each recessed portion can be set to 10 to 20 mm, and a depth dimension of each recessed portion can be set to 3 to 10 mm. Further, a separation dimension L3 (pitch) between adjacent recessed portions can be set to 10 to 30 mm, and the number of recessed portions to be formed can be set according to the separation dimension (a typical formation number is 8 or 9). With such a configuration, the recessed portions 21a to 21i, 22a to 22i can be placed independently from each other such that adjacent recessed portions are not connected to each other even after the first deformable portion R1 is bent.

Further, a separation portion (not shown) and a plurality of recessed portions 20 are also formed in each of the third deformable portion R3 and the fourth deformable portion R4, and a basic configuration of each portion is generally the same as a corresponding portion of the first deformable portion R1 (in FIG. 2, a common reference sign 20 is assigned to each recessed portion for convenience). In the third deformable portion R3 and the fourth deformable portion R4, a linear separation portion (not shown) extending in an up-down direction is formed in a center of each of their inner sides R1. Further, the plurality of recessed portions 20 is sequentially placed in a symmetric manner on a right side and on a left side across the separation portion. That is, a plurality of recessed portions 20 is placed at appropriate intervals on the right side of the separation portion, and a plurality of recessed portions 20 is also placed at appropriate intervals on the left side of the separation portion 10. Each of the recessed portions 20 is gradually inclined in a direction to be distanced from the separation portion 10 as it goes from an upper part of the side frame 6b toward a lower part thereof.

In the present embodiment, at the time of forming the seat frame 6F in FIG. 2, a tubular base material (not shown) that is relatively hard and has a straight shape can be used. The base material is bent little by little at parts corresponding to the deformable portions R1 to R4 with individual recessed portions (21a to 21i, 22a to 22i, 20) being taken as base points, so as to form the seat frame 6F. Here, a formation method of each recessed portion is not limited in particular. However, in a case where a cylindrical base material is used, for example, a plurality of recessed portions is formed in advance at a suitable part (a part corresponding to an inner side of each deformable portion) by press work by use of a punch mechanism, a press plate, or the like. Further, in a case where a squarely cylindrical base material is used as an example, a metal plate having its unfolded shape is prepared, and then, a plurality of recessed portion is formed in advance at a suitable part of the metal plate. Then, the metal plate is bent appropriately to form the squarely cylindrical base material, and then, the recessed portions are placed at a part on the inner side of each deformable portion.

Then, with reference to FIG. 2, the base material is bent at parts corresponding to the first deformable portion R1 and the second deformable portion R2, and then, is curved at parts corresponding to the third deformable portion R3 and the fourth deformable portion R4. At this time, in the present embodiment, the base material is gradually bent downward at the parts corresponding to the first deformable portion R1 and the second deformable portion R2, so as to form a side-frame-6b side. That is, the first deformable portion R1 and the second deformable portion R2 are gradually bent from an upper-frame-6a side toward the side-frame-6b side. Further, the base material is gradually bent rearward at the parts corresponding to the third deformable portion R3 and the fourth deformable portion R4, so as to form a lower side of the side frame 6b. That is, the third deformable portion R3 and the fourth deformable portion R4 are gradually curved from an upper side of the side frame 6b toward the lower side thereof. At the time of bending the deformable portions R1 to R4, a stress in a contraction direction is applied to parts to become respective inner sides R1 thereof and a stress in an extension direction is applied to parts to become respective outer sides R0 thereof.

In view of this, at the time of bending each of the deformable portions R1 to R4, the recessed portions 21a to 21i, 22a to 22i, 20 on the inner side R1 are further recessed with the recessed portions 21a to 21i, 22a to 22i, 20 being taken as base points. Thus, a circumference length difference occurring between the outer side R0 and the inner side R1 of each of the deformable portions R1 to R4 is absorbed. However, at this time, it should be avoided as much as possible that a specific recessed portion is recessed excessively. In view of this, in the present embodiment, the plurality of recessed portions (21a to 21i, 22a to 22i, 20) and the separation portion 10 are provided in each of the deformable portions R1 to R4, so as to be placed independently from each other such that adjacent recessed portions are not connected to each other even after the deformation. Here, the deformable portions R1 to R4 have generally the same configuration, so the following describes the first deformable portion R1 specifically as an example.

That is, with reference to FIGS. 2 to 5, the front-side recessed portions 21a to 21i and the rear-side recessed portions 22a to 22i are placed sequentially in a symmetric manner across the separation portion 10 at a part of the base material, the part corresponding to the first deformable portion R1. The base material is gradually bent downward at the part corresponding to the first deformable portion R1, so as to form the side-frame-6b side. At this time, the front-side recessed portion 21a and the rear-side recessed portion 22a on the upper-frame-6a side are first further recessed as base points, so as to bend the part corresponding to the first deformable portion R1. At this time, in the present embodiment, the front-side recessed portion 21a and the rear-side recessed portion 22a are formed independently across the separation portion 10 and configured so as not to become excessively large. Thus, the front-side recessed portion 21a and the rear-side recessed portion 22a are placed independently from each other such that adjacent recessed portions are not connected to each other even after the deformation. With this configuration, even if the front-side recessed portion 21a and the rear-side recessed portion 22a are further recessed, it is possible to recess them appropriately by preferably preventing an excessive stress from being applied thereto at this time. The remaining front-side recessed portions 21b to 21i and the remaining rear-side recessed portions 22b to 22i are also formed independently across the separation portion 10 and configured so as not to become excessively large. Thus, they are placed independently from each other such that adjacent recessed portions are not connected to each other even after the deformation. On this account, respective pairs of the remaining front-side recessed portions 21b to 21i and the remaining rear-side recessed portions 22b to 22i are recessed appropriately as base points in an alphabetical order, so as to bend the part corresponding to the first deformable portion R1. Thus, in the present embodiment, the first deformable portion R1 can be bent while the recessed portions 21a to 21i, 22a to 22i are recessed as equally as possible. Further, in the present embodiment, the front-side recessed portions 21a to 21i and the rear-side recessed portions 22a to 22i are placed sequentially in a symmetric manner across the separation portion 10. Hereby, each pair of the front-side recessed portion and the rear-side recessed portion placed symmetrically is sequentially taken as a base point (each pair is taken as a base point in an alphabetical order like a pair of 21a and 22a, a pair of 21b and 22b, and the like), so that the first deformable portion R1 can be bent in the seat front-rear direction in a good balance.

Here, the inventors found that, when the straight-shaped base material were bent without forming the recessed portions as an example, recesses were naturally formed on an inner side of the base material. At that time, the base material was bent from one end toward the other end. Here, a pair of linear recesses inclined in a straight shape in a direction to be gradually distanced from the one side toward the other side were formed at a bent part of the base material. From this fact, the inventors considered that a stress was applied to a deformed portion corresponding to the recesses, and the recesses thus formed had a shape according to a stress distribution occurring at this time. In view of this, in the present embodiment, each of the recessed portions 21a to 21i, 22a to 22i was formed in an inclined shape that is gradually distanced from the separation portion 10 as it goes from the upper-frame-6a side as an example of the one end toward the side-frame-6b side as an example of the other end. That is, a shape of each of the recessed portions 21a to 21i, 22a to 22i is assumed a shape that follows a recess to naturally occur on the inner side R1 of the first deformable portion R1 at the time of bending. With such a configuration, the recessed portions 21a to 21i, 22a to 22i can be smoothly recessed at the time when the first deformable portion R1 is bent.

As described above, in the present embodiment, the recessed portion 21a to 21i, 22a to 22i, 20 are formed independently across the separation portion 10 so as not to become excessively large. By preferably preventing a strong stress from being applied to only a specific recessed portion as such, the first deformable portions R1 to R4 of the seat frame 6F can be bent while the recessed portions 21a to 21i, 22a to 22i, 20 are recessed as equally as possible. Further, in the present embodiment, the shape of each of the recessed portions 21a to 21i, 22a to 22i, 20 is assumed a shape that follows a stress distribution to occur on the inner side R1 of each of the deformable portions R1 to R4 at the time of bending thereof. Thus, each of the deformable portions R1 to R4 can be bent while each of the recessed portions 21a to 21i, 22a to 22i, 20 is recessed smoothly. In the present embodiment, the recessed portions 21a to 21i or the like on one side and the recessed portions 22a to 22i or the like on the other side are placed in a symmetric manner across the separation portion 10. Thus, each of the deformable portions R1 to R4 can be bent in a good balance with each pair of the recessed portions 21a to 21i, 22a to 22i, 20 is sequentially taken as base points. Consequently, according to the present embodiment, the excessive deformation of the seat frame 6F can be restrained as much as possible.

Here, various configurations can be employed as the configuration (a shape, a dimension, an arrangement relationship, and the like) of the recessed portion, in addition to the above configuration. For example, with reference to FIG. 6, in a first deformable portion R1 of Modification 1, a plurality of front-side recessed portions 31a to 31c and rear-side recessed portions 32a to 32c is placed sequentially in a symmetric manner across a separation portion 10. Each of the plurality of front-side recessed portions 31a to 31c is in a curved shape that swells in a direction to be distanced from the separation portion 10, and is gradually inclined in the direction to be distanced from the separation portion 10 as it goes toward a side frame side on a lower side from an upper frame side on an upper side. Further, each of the plurality of rear-side recessed portions 32a to 32c is also in a curved shape that swells in a direction to be distanced from the separation portion 10, and is gradually inclined in the direction to be distanced from the separation portion 10 as it goes toward the side frame side on the lower side from the upper frame side on the upper side. In this modification, each of the front-side recessed portions 31a to 3k and each of the rear-side recessed portions 32a to 32c have a curved shape that swells in the directions to be distanced from the separation portion 10 and are placed away from each other as much as possible. Accordingly, in this modification, the recessed portions 31a to 31c, 32a to 32c are placed further surely independently from each other even after the deformation thereof, thereby making it possible to preferably avoid adjacent recessed portions (e.g., the recessed portion 31a and the recessed portion 32a) from being connected to each other.

Figure 7:
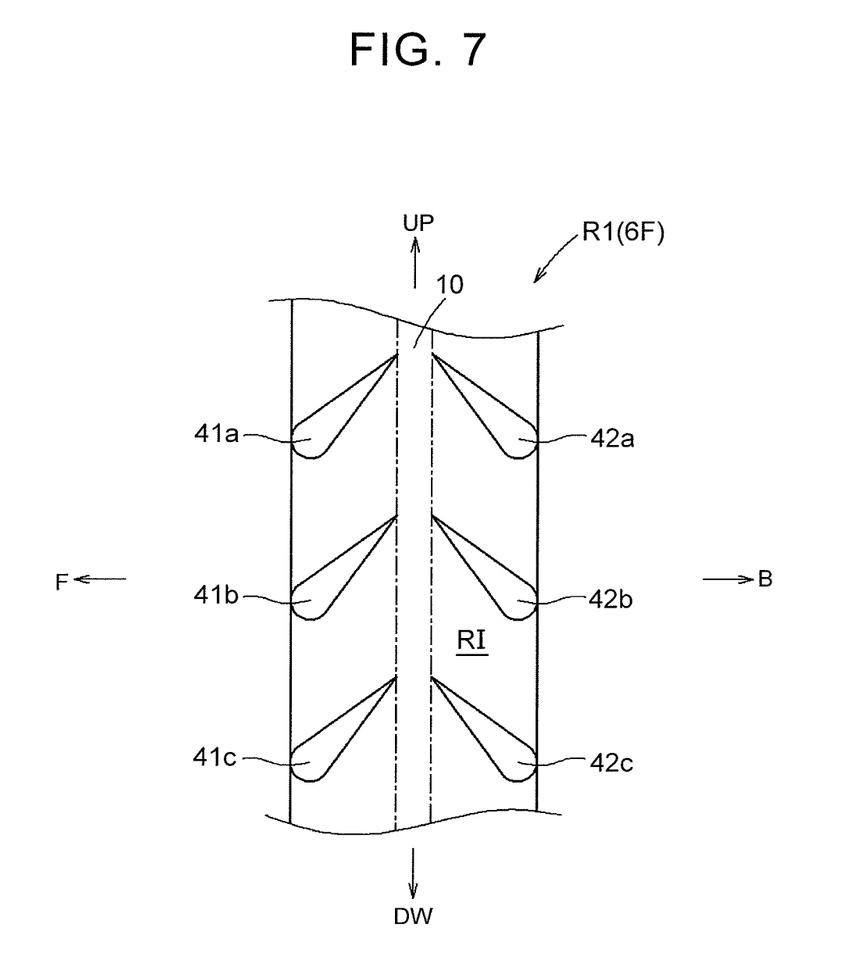
FIG. 7 is an enlarged front view of part of an inner side of a seat frame according to Modification 2.

Further, with reference to FIG. 7, in a first deformable portion R1 of Modification 2, a plurality of front-side recessed portions 41a to 41c and rear-side recessed portions 42a to 42c is placed sequentially in a symmetric manner across a separation portion 10. Each of the plurality of front-side recessed portions 41a to 41c has a drop shape (a droplet shape) in a front view, and is gradually inclined in a direction to be distanced from the separation portion 10 as it goes toward a side frame side on a lower side from an upper frame side on an upper side. Each of the recessed portions 41a to 41c is formed in a shape in which its tip portion close to the separation portion 10 has a narrow width and its end side is gradually widened as it is distanced from the separation portion 10 so as to have a generally semicircular shape. Further, similarly, each of the plurality of rear-side recessed portions 42a to 42c also has a drop shape (a droplet shape) in a front view, and is gradually inclined in a direction to be distanced from the separation portion 10 as it goes toward the side frame side on the lower side from the upper frame side on the upper side. In this modification, each of the front-side recessed portions 41a to 41c and each of the rear-side recessed portions 42a to 42c have a drop shape (a droplet shape) in a front view, and their tip portions close to the separation portion 10 have a narrow width. Accordingly, in this modification, it is possible to preferably avoid each of the recessed portions 41a to 41c, 42a to 42c from being connected to another recessed portion adjacent thereto on a tip end side formed with a narrow width as such.

Figure 8:
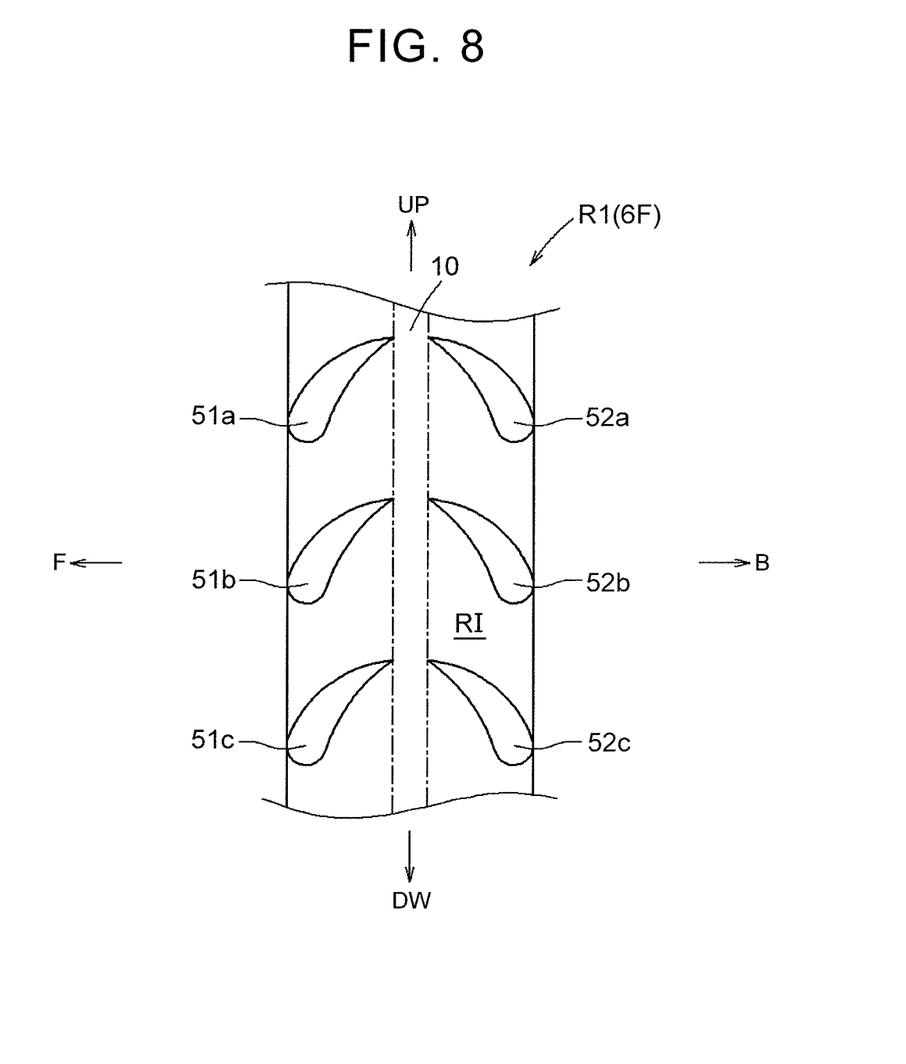
FIG. 8 is an enlarged front view of part of an inner side of a seat frame according to Modification 3.
Figure 9:
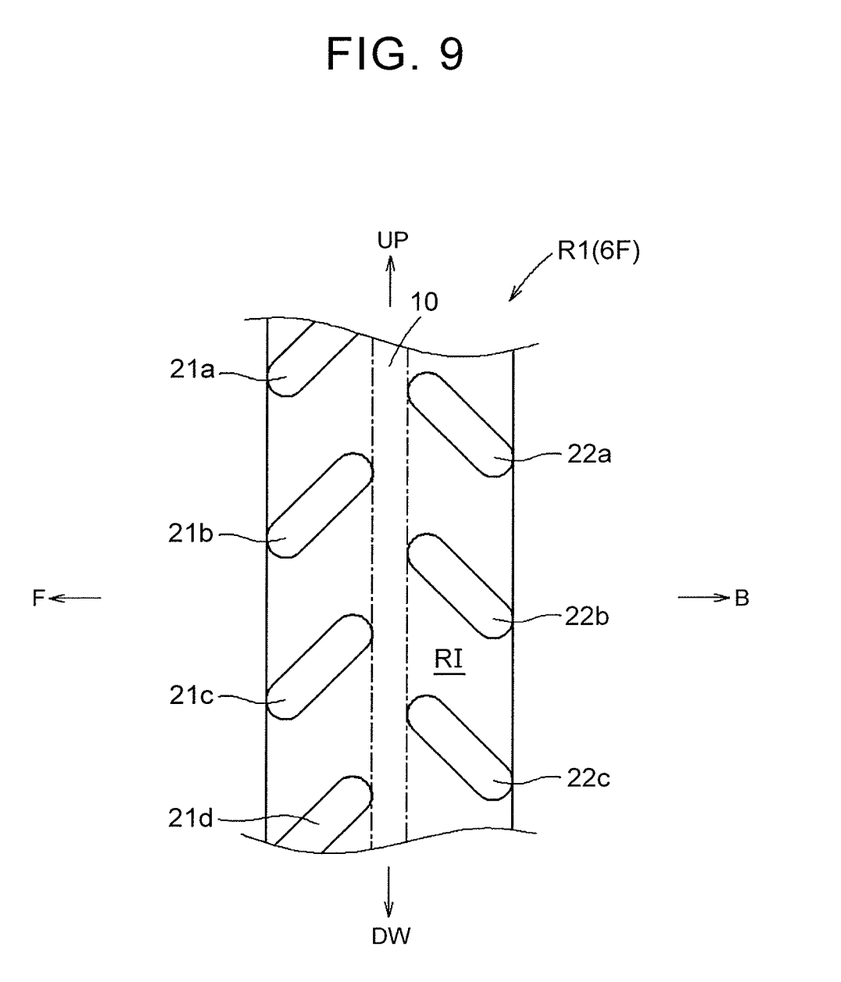
FIG. 9 is an enlarged front view of part of an inner side of a seat frame according to Modification 4.

Further, with reference to FIG. 8, in a first deformable portion R1 of Modification 3, a plurality of front-side recessed portions 51a to 51c and rear-side recessed portions 52a to 52c is placed sequentially in a symmetric manner across a separation portion 10. Each of the plurality of front-side recessed portions 51a to 51c has a drop shape (a droplet shape) in a front view and also has a curved shape that swells in a direction to be distanced from the separation portion 10. Similarly, the plurality of rear-side recessed portions 52a to 52c has a drop shape (a droplet shape) in a front view and also has a curved shape that swells in a direction to be distanced from the separation portion 10. Accordingly, in Modification 3, it is possible to further preferably avoid each of the recessed portions 51a to 51c, 52a to 52c from being connected to another recessed portion adjacent thereto.

Further, a plurality of front-side recessed portions and rear-side recessed portions can be placed in an asymmetric manner across a separation portion. For example, with reference to FIG. 9, in a first deformable portion R1 of Modification 4, a plurality of front-side recessed portions 21a to 21d and rear-side recessed portions 22a to 22c is placed alternatively in an asymmetric manner across a separation portion 10. Thus, also in Modification 4, the first deformable portion R1 can be bent while the recessed portions 21a to 21d, 22a to 22c are recessed as equally as possible.

The following describes the present embodiment based on an example, but the present invention is not limited to the example. In Example 1, with reference to FIG. 5, a deformable portion R1 with a bend radius of R×80 mm was formed in a cylindrical seat frame 6F (diameter φ=35 mm, thickness t=1.0 mm, material=980 Mpa-grade high tensile strength steel material). Then, in the deformable portion R1 before deformation, nine front-side recessed portions 21a to 21i and nine rear-side recessed portions 22a to 22i were formed in a symmetric manner across a separation portion 10. At this time, with reference to FIG. 4, a width dimension L1 of the separation portion 10 was set to 10 mm. Further, a linear dimension L2 of each of the recessed portions 21a to 21i, 22a to 22i was set to 15 mm, a depth dimension was set to 6 mm, and a separation dimension L3 between adjacent recessed portions was set to 25 mm.

In the seat frame 6F after the deformation in Example 1, the deformable portion R1 was generally bent in a good balance. That is, with reference to FIG. 5, when the deformable portion R1 was checked by visual inspection, the recessed portions 21a to 21i, 22a to 22i had a generally uniform recess amount, and no break or crack occurred on bottom sides thereof. This is presumably because the recessed portion 21a to 21i, 22a to 22i were formed independently across the separation portion 10 so as not to become excessively large, so that a strong stress could be preferably prevented from being applied to only a specific recessed portion. From this result, according to the configuration of Example 1, it is found that the deformable portion R1 could be bent while the recessed portions 21a to 21i, 22a to 22i were recessed as equally as possible. Further, in the seat frame 6F, it was found that a partial decrease in strength of the deformable portion R1 could be avoided preferably.

The vehicle seat of the present embodiment is not limited to the above embodiment, and other various embodiments can be employed. For example, the present embodiment exemplifies the configuration (a shape, a dimension, a formation number, an arrangement relationship, and the like) of each of the deformable portions R1 to R4. However, the configuration of each of the deformable portions is modifiable appropriately according to a seat configuration. For example, each of the deformable portions can have various flexure shapes such as a crank shape and a zigzag shape, other than a bending shape, a curved shape, and the like. Further, at least one of the deformable portions R1 to R4 may be formed at an appropriate position of the seat frame, or other deformable portions different from the deformable portions R1 to R4 may be formed. Further, the present embodiment exemplifies deformable portions having a cylindrical shape (a generally round shape in a sectional view) and a squarely cylindrical shape (a generally rectangular shape in a sectional view), but a sectional shape of each deformable portion may be various shapes, e.g., a circular shape such as a round shape or an elliptical shape, and a polygonal shape such as an oblong shape, a rectangular shape, or a triangular shape. Note that, in the present embodiment, the whole seat frame including the deformable portions is formed in a hollow tubular shape, but this is not intended to limit the configuration of the seat frame. For example, either of the upper frame and the side frame can be formed in a hollow tubular shape and the other one of them can be formed in a flat-plate shape.

A bending direction of each of the deformable portions R1 to R4 is appropriately modifiable according to a formation procedure of the seat frame 6F. For example, in the present embodiment, the first deformable portion R1 and the second deformable portion R2 are gradually bent from the upper-frame-6a side toward the side-frame-6b side, but conversely, they can be also gradually bent from the side-frame-6b side toward the upper-frame-6a side. In this case, it is desirable that each of the recessed portions 21a to 21i, 22a to 22i be formed in an inclined shape that is gradually distanced from the separation portion 10 as it goes from the side-frame-6b side as an example of one end toward the upper-frame-6a side as an example of the other end.

Further, the present embodiment exemplifies the configuration (a shape, a dimension, a formation number, an arrangement relationship, and the like) of the recessed portions 21a to 21i, 22a to 22i, 20. However, the configuration of the recessed portions is modifiable appropriately according to a seat configuration. For example, the recessed portions may be placed perpendicularly to a direction where the deformable portion extends, or can be formed in an inclined shape reverse to the example (a shape gradually inclined in a direction to be distanced from the separation portion as it goes toward one end of the deformable portion from the other end thereof). Further, each of the recessed portions can be formed in various linear shapes such as a zigzag shape and a wave shape other than a straight shape and a curved shape. Further, the plurality of front-side recessed portions (rear-side recessed portions) may be formed in different shapes in different directions. Further, the configuration of the recessed portions in the embodiment and the configurations of the recessed portions in respective modifications can be used in combination appropriately.

Further, the present embodiment exemplifies the configuration (a shape, a dimension, a formation number, an arrangement relationship, and the like) of the separation portion 10. However, the configuration of the separation portion 10 is modifiable appropriately according to a seat configuration. For example, the separation portion may be formed in a projecting manner relative to the recessed portions, and may be formed in a recessed manner or a projecting manner relative to the other circumferential surface of the deformable portion. Further, the separation portion may be placed in a center on an inner side of the deformable portion or may be formed to slightly deviate from the center on the inner side. The separation portion may be formed continuously on the inner side of the deformable portion or may be formed intermittently.

Further, the present embodiment deals with the seatback 6 as an example, but the configuration of the present embodiment is applicable to various seat constituent components such as the seat cushion 4 and the headrest 8. Further, the configuration of the present embodiment is applicable to general vehicle seats for a vehicle, an aircraft, an electric railcar, and the like.

What is claimed is:

1. A vehicle seat comprising:
   a seat frame having a hollow deformable portion that is bent and that includes:
   linear recessed portions that are partially recessed from an inner side of the deformable portion; and
   a linear separation portion that projects relative to the recessed portions and that extends on the inner side of the deformable portion, wherein
   a plurality of the recessed portions are provided on each of a first side and a second side of the separation portion so as to sandwich the separation portion, and
   each of the recessed portions are provided independently from each other such that adjacent recessed portions are not connected to each other.

2. The vehicle seat according to claim 1, wherein
   each of the recessed portions are arranged to gradually incline in a direction from a first end of the seat frame to a second end of the seat frame.

3. The vehicle seat according to claim 2, wherein
   the plurality of the recessed portions provided on the first side of the separation portion and the plurality of the recessed portions provided on the second side of the separation portion are provided in a symmetric manner across the separation portion.

4. The vehicle seat according to claim 2, wherein
   the recessed portions are each shaped such that a part of each recessed portion disposed adjacent to the separation portion has a width narrower than other parts of the respective recessed portion.

5. The vehicle seat according to claim 1, wherein
   the plurality of the recessed portions provided on the first side of the separation portion and the plurality of the recessed portions provided on the second side of the separation portion are provided in a symmetric manner across the separation portion.

6. The vehicle seat according to claim 5, wherein
   the recessed portions are each shaped such that a part of each recessed portion disposed adjacent to the separation portion has a width narrower than other parts of the respective recessed portion.

7. The vehicle seat according to claim 1, wherein
   the recessed portions are each shaped such that a part of each recessed portion disposed adjacent to the separation portion has a width narrower than other parts of the respective recessed portion.

8. The vehicle seat according to claim 1, wherein
   the separation portion extends between terminal ends of each of the plurality of the recessed portions provided on the first side of the separation portion and terminal ends of each of the plurality of the recessed portions provided on the second side of the separation portion.

9. The vehicle seat according to claim 1, wherein
   a longitudinal dimension of each of the recessed portions extends in a direction askew from a longitudinal dimension of the separation portion.

10. The vehicle seat according to claim 1, wherein
    the inner side of the deformable portion faces a region that is at least partially surrounded by the seat frame.

* * * * *